United States Patent
Schupack et al.

[11] 3,893,270
[45] July 8, 1975

[54] PRESSURE VESSEL

[76] Inventors: Morris Schupack, 37 Split Rock Rd., South Norwalk, Conn. 06854; Andres van der Poll, 12 Fishing Trl., Stamford, Conn. 06903

[22] Filed: Oct. 25, 1973

[21] Appl. No.: 409,496

Related U.S. Application Data

[63] Continuation-in-part of Ser. No. 271,322, July 12, 1972, abandoned.

[52] U.S. Cl. .......... 52/80; 52/224; 52/741; 176/87
[51] Int. Cl. ............ E04b 7/08; E04c 3/26
[58] Field of Search ........... 52/80, 224, 741; 176/87

[56] References Cited
UNITED STATES PATENTS

| | | | |
|---|---|---|---|
| 3,237,358 | 3/1966 | Harris | 52/224 |
| 3,318,780 | 5/1967 | Bohmann et al. | 52/80 X |
| 3,349,524 | 10/1967 | Fistedis | 52/224 X |
| 3,390,211 | 6/1968 | Ziegler | 52/224 X |
| 3,424,239 | 1/1969 | Coudray | 52/224 X |
| 3,686,875 | 8/1972 | Tindal | 52/224 X |

FOREIGN PATENTS OR APPLICATIONS

| | | | |
|---|---|---|---|
| 914,912 | 7/1946 | France | 52/224 |
| 720,736 | 12/1954 | United Kingdom | 52/223 R |
| 214,464 | 8/1967 | Sweden | 52/224 |

*Primary Examiner*—Alfred C. Perham

[57] ABSTRACT

A containment structure constructed in accordance with the features of this invention comprises an upstanding walled body which is formed of concrete and which includes an integral generally cylindrically-shaped member and an integral generally hemispherically-shaped closure member. A plurality of elongated prestressing tendons is provided each of which extends continuously throughout the length of the body within the wall of the body between first and second anchor locations which are positioned at a same general longitudinal location. The tendons extend in a helical path through the walls of the cylindrical segment and form an angle with the horizontal of between about 35°–55° and extend through an arc through the hemispherical segment.

16 Claims, 17 Drawing Figures

PATENTED JUL 8 1975

3,893,270

SHEET 1

PATENTED JUL 8 1975    3,893,270

SHEET 4

LEFT HAND HELIX

Fig. 15.

RIGHT HAND HELIX

SPRING LINE

Fig. 16.

PRESSURE VESSEL

This application is a continuation-in-part application of U.S. Pat. Ser. No. 271,322, filed July 12, 1972, and now abandoned.

This invention relates to relatively large concrete structures employed as enclosures, pressure vessels and the like. The invention relates more particularly to an improved prestressing arrangement for vessels of this type and to an improved method of erecting structures of this type.

The need exists in various technologies for providing relatively large containment structures or pressure vessels of high strength. In particular, in the nuclear power generating field wherein nuclear energy is converted to electrical energy, the radiation hazards attending a malfunction or breakdown have necessitated the construction of special confinement structures. The structural requirements are particularly rigorous in the case of pressurized water nuclear reactors, wherein components operating under relatively high pressure, represent sources of potential radiation under adverse conditions.

A typical concrete nuclear containment structure for a pressurized water reactor comprises a relatively thick walled upstanding cylindrically shaped segment which is enclosed by an integral dome-shaped roof segment. The cylindrically shaped segment has an inner diameter of about 130 feet, a height of about 165 feet, and a wall thickness of approximately four feet. The dome-shaped roof segment has a similar thickness and a radius of about 65 to 110 feet. The structure is integrally cast with a foundation slab or mat having a diameter of about 150 feet and a thickness on the order of 9 to 10 feet. A circumferential gallery or tunnel to provide access to bottom tendon anchorages is integrally cast with the structure and is positioned near the foundation. In order to assure that the structure is essentially impermeable to gases and liquids, the inner wall of the structure is lined with about a ¼ inch steel plate.

A nuclear containment structure of this type is subjected to various types of loading. External loads which can operate on the body include dead and live loads, wind, tornado or hurricane and earthquake loads. In addition, a structure containing a pressurized water reactor under breakdown conditions is subjected to internal loads which necessitate a design capable of safely withstanding internal pressure of about 60 lbs./in$^2$. In practice, concrete structures capable of supporting these loads have been erected with post-tensioned, prestressing techniques as well as conventional concrete reinforcing techniques. The structure is erected in skeleton form by initially forming an inner metal liner conforming to the shape of the structure. A plurality of tendon conduits are then arrayed along loci which are to be occupied by the prestressing tendons. Conventional reinforcement means are also erected. The concrete is then placed and the tendons are subsequently introduced into each of the conduits, and are tensioned and anchored.

Various tendon geometries have been employed. Each of these geometries has provided a separate or generally independent tendon arrangement for the upstanding cylindrically-shaped segment and for the dome-shaped roof segment. This has been achieved generally by integrally forming in the structure, anchoring locations including a gallery at the base of the structure, a ring girder comprising an enlarged peripheral wall section near the upper end of the cylindrical segment and several longitudinally extending buttresses which extend between the ring girder and the foundation mat. A plurality of rectilinear vertically extending tendons are anchored between the gallery and the ring girder for providing a vertical prestressing force component for the cylindrically-shaped segment. A plurality of hoop-shaped tendons are positioned in horizontal planes and are spaced vertically along the cylindrically-shaped segment and are anchored to buttresses for providing radial prestressing force components for the cylindrically-shaped segment. A plurality of tendons also extends through the thickness of the dome-shaped roof segment between different locations of the ring girder for providing horizontal and vertical prestressing forces for the roof segment.

The employment of a ring girder and of the longitudinally extending buttresses with this containment structure introduces a number of undesirable limitations. More particularly, the employment of a ring girder in a containment structure substantially complicates the design analysis since the ring girder cannot be analyzed by thin shell theory, the thermal stress distribution throughout the ring girder is not readily obtained by simple formulas, and because it is relatively difficult to treat point concentrated loads to represent individual tendon anchorages. The design of a ring girder for a containment structure is undesirably complicated because its area creates discontinuity of membrane forces with resulting high concrete stresses and the need for reinforcement. In addition, the use of a ring girder does not permit an accurate prediction of the structural performance of the structure since the ring girder represents irregularities in the shell configuration.

In addition to the various analysis and design problems introduced by the use of a ring girder, various structural and construction limitations arise. A ring girder in a prestressed concrete containment structure is a device to permit tendons to be spliced. In a bonded tendon arrangement, wherein a grouting material is placed between the tendon and inner wall of the tendon conduit a force redundancy advantageously results from the bonding. However, tendon bond development length is generally on the order of at least 15 feet. This length cannot be readily provided within the body of present design ring girders. Consequently, the tendon splices accompanying the use of a ring girder neutralize in part the advantages of the redundant force.

A ring girder requires a large amount of complicated reinforcement to take care of bursting, spalling and discontinuity stresses. This reinforcement is very difficult to place because of the congestion of embedded elements such as the tendon anchorages and reinforcement. Further limitations accompanying the use of a ring girder include the need for the provision of a substantial number of pieces of anchorages hardware and the necessity for providing protection for the tendon anchorage. The fabrication of the ring girder requires extensive and complicated forms, particularly to accommodate dome tendon anchorage pockets. The placement of the concrete is thereby rendered relatively difficult and the time for accomplishing the same is relatively long because of the congestion of the various embedded items. Extensive scaffolding, material and personnel hoists for the installation of post-tensioning system tendons is also necessitated. Personnel with relatively heavy and delicate equipment must operate at uncomfortable heights during the tendon installation, tensioning and grouting or greasing and the tendon monitoring. The use of the ring girder positions tendon anchorages in an exposed location insofar as corrosive attack is concerned. Relatively complicated drainage problems must therefore be resolved in order to minimize this effect. Employment of a ring girder renders the post-tensioning operation dependent on day-to-day weather and upon seasonal weather conditions. Surveillance of the tendon anchorages becomes difficult. The additional construction involved in the provision of a ring girder results in a relatively long construction time for a prestressed concrete containment structure having a ring girder.

The construction of a concrete containment structure having buttresses is subject to many of the similar limitations accompanying the use of a ring girder. The analysis of the structure becomes relatively complicated since the structure is not axisymmetric. In the fabrication process, the use of buttresses for pressure vessels which are designed for the higher range of pressures, i.e., 30 psi or greater, makes slip forming nearly unfeasible and substantially uneconomical because of the relatively large number and weight of pieces which are to be embedded. The buttresses complicate conventional jump forms because they nullify their capacity to resist fresh concrete pressures in ring action. Placement of concrete is difficult because of the congestion and requires shallow concrete lifts which in turn delay concrete wall construction. The use of buttresses delays the completion of adjacent structures and systems such as piping, electrical raceways and the like because of the space requirements necessary for post-tensioning operations. The delay extends until completion of post-tensioning thereby forcing the post-tensioning into a critical path in scheduling.

Various modifications to the basic containment structure arrangement described above have been provided. For example, the horizontally orientated hoop tendons have been eliminated by providing tendons which are anchored between the ring girder and the gallery and which extend along a locus which forms an angle with the horizontal. Both vertical and radial force components are provided for the cylindrically-shaped housing segment with this arrangement. However, this arrangement undesirably necessitates the use of a ring girder and its many attending disadvantages.

In another tendon geometry, the tendons which prestress the roof segment comprise elongated tendons which are anchored at one location in the gallery, extend vertically up to the ring line, over the dome-shaped segment and down vertically to another location in the gallery. This latter arrangement provides the desired prestressing for the roof segment and vertical prestress for the cylinder. It does not, however, provide radial prestressing forces on the cylindrically-shaped segment of the structure and hoop tendons must also be provided to establish radial forces.

Various other considerations relating to the arrangement of the tendons in the containment structure contribute to the complexity of the arrangement. The geometry of the tendons is a factor which is significant in establishing the friction loss upon prestressing, the type of stresses established in the prestressed structure, and the wall thickness which must be capable of confining a large number of tendons without overlapping or weaving. Tendon friction losses in a prestressed containment structure are dependent upon the forces exerted on the structure by the tendon. For example, in the tendon geometry referred to hereinbefore wherein a tendon extends vertically from the gallery to the ring line, extends over the dome and returns in a vertical direction from the ring line to the gallery, frictional losses occur only along the segment traversing the dome since the vertically extending segments do not directly exert prestressing forces on the cylindrical body of the structure and accordingly experience substantially no friction loss. In another exemplary tendon geometry referred to hereinbefore wherein tendons anchored between a ring girder and a gallery extend along a locus which forms an angle with the horizontal, the prestressing forces established on the cylindrical segment of the containment structure by these tendons results in tendon frictional losses. It is desirable to provide a tendon geometry which minimizes the friction losses encountered. It is also desirable that the prestressing forces which are established by the tendons be distributed uniformly throughout the body of the containment structure. The geometry of the tendons is important in this regard since the arrangement of the tendons is an important factor in establishing uniform stresses throughout the body. Bunching of the tendons which can occur at the apex of the dome segment will result in an undesirable nonuniform distribution of stresses in the body.

The wall thickness of the containment structure is determined in large part, as indicated, by the geometry of the tendons. The tendons exhibit a finite cross-sectional dimension which may be on the order of 4 to 8 inches in diameter and can therefore create difficult problems in laying the tendons about the body. Because of the relatively large cross-sectional area and the relatively large prestressing tensile forces applied to the tendon, weaving of one tendon about another tendon cannot be tolerated. While the tendons are spaced apart by a sufficient distance to avoid crossovers and weavings, this spacing even with a relatively low number of tendons can result in an undesirably large body wall thickness.

The geometries of the tendon segments, i.e., the segment extending longitudinally along the length of a cylindrical portion of the containment structure and the segment extending over the dome of the containment structure are interrelated and the geometry of the tendons on the dome segment will determine in part the necessary wall thickness of the cylindrical portion for sustaining forces which are exerted under the cylindrical portion as a result of prestressing forces exerted on the dome segment.

The erection of a containment structure of this type has been relatively complex and costly in terms of the length of time required for erection, the man-hours required, and more particularly, the interference with structures which are erected concurrently with the containment structure and which interfere with it. Prior tendon geometries have required a relatively large number of tendons. Paramount in the cost of this large number of tendons is the man-hours which have been required to install and tension the tendons. The tensioning of a tendon is a relatively arduous task and requires that the structural work be provided with a substantial work platform and ready access to the tendons. On the contrary, in prior arrangements, the large number of both dome and cylindrical body tendons has required that workers anchor the tendons at the ring girder and along the vertical buttresses and thus work at a relatively high elevation from the ground under relatively crowded conditions. The reinforcing steel disposed around anchorage locations continues to major congestion making placement of reinforcement steel and concrete difficult and expensive. Further, as indicated hereinbefore, the hoop-shaped tendons have been anchored to the vertically extending buttresses. In order to provide access to these tendons for post-tensioning, the erection of other structures which interferes with the vessel must be delayed subsequent to the post-tensioning procedure, or alternatively, access holes must be provided in the interfacing structure. The first alternative can result in a costly delay in the construction of the site not only with respect to the additional labor involved but also with respect to the lost operating capacity. This latter aspect is particularly significant and for power generating plants capable of generating on the order of 700 megawatts, this loss amounts to about $100,000.00 per day of inoperation. The second alternative results in additional cost incurred in locating and providing for access holes through the interfacing structure.

Accordingly, it is an object of this invention to provide an improved form of prestressing arrangement for a relatively large structure having cylindrical and dome-shaped segments.

Another object of the invention is to provide an improved containment vessel for a nuclear power reactor.

A further object of the invention is to provide a concrete containment structure which reduces the labor and the number of prestressing tendons required for the structure.

Another object of the invention is to provide an improved pressure vessel which eliminates the prior need for the provision of both buttresses and a ring girder for anchoring tendons and which simultaneously eliminates the use of horizontally orientated hoop tendons.

Another object of the invention is to provide a prestressed concrete containment structure having a plurality of prestressing tendons which avoids excessive overlapping or weaving of the tendons.

Another object of the invention is to provide a prestressed concrete containment structure having a relatively large number of prestressing tendons which are arranged in a manner for increasing the uniformity of distribution of stresses within the structure.

Another object of the invention is to provide a prestressed concrete containment structure having a plurality of prestressing tendons which are arranged in a manner for maintaining a relatively thin structure thickness.

Another object of the invention is to provide a nuclear containment vessel having an improved means for supporting tendon conduits within a wall of the vessel.

Another object of the invention is to provide an improved concrete structure having a liner positioned therein and an improved means for positioning concrete reinforcing means near an outer surface of the structure.

Another object of the invention is to provide an improved method for erecting a prestressed post-tensioned structure.

Another object of the invention is to provide an improved pressure vessel which provides for the performance of post-tensioning operations at a central location and which is substantially independent of adverse weather conditions.

Another object of the invention is to provide a liner for a structure which is initially formed in segments which are erected and secured together.

Another object of the invention is to provide an improved pressure vessel adapted for construction by slip forming concrete placement techniques.

Another object of the invention is to provide an improved pressure vessel which is constructed with relatively less post-tensioned tendon anchorages that have been required by prior arrangements of substantially equivalent size.

Still another object of the invention is to provide a relatively large concrete structure adapted for withstanding relatively severe seismic loading.

A containment structure constructed in accordance with features of this invention comprises an upstanding walled body which is formed of concrete and which includes an integral, generally cylindrically-shaped member and an integral generally hemispherically-shaped closure member. A plurality of elongated prestressing tendons is provided each of which extends continuously throughout the length of the body within the wall of the body between first and second anchor locations which are positioned at a same general longitudinal location. The tendons extend in a helical path through the wall of the cylindrical member and form an angle with the horizontal of between about 35°–55° and extend in an arc through the hemispherical member.

In accordance with more particular features of the invention, a nuclear containment structure comprises an integral walled, vertically orientated, cylindrically-shaped member and an integral generally hemispherically-shaped member extending from an upper end of the cylindrically-shaped member and forming a closure for the containment structure. The structure is positioned on a horizontally orientated foundation and includes a circumferentially extending gallery which is positioned at a second end of the cylindrically-shaped member near the foundation. A plurality of elongated prestressing tendons is provided each of which extends continuously and successively from an anchoring location in the gallery along a helical path about the cylindrical member in an arc about the closure member and along a helical path about the cylindrical member to a second anchoring location in the gallery. The path of the helically extending tendons forms an angle of between about 35°–55° with the horizontal. The tendons are arrayed in a plurality of families in the closure member and in a plurality of surfaces in the cylindrical member of the body.

It is important that the slope of the path of the helically extending tendons be maintained within the range of between about 35°–55° with the horizontal. Tendon slopes within the range provide for walled structures of reasonable and practical utility. Helical angles outside of this range require relatively large tendon prestressing forces in order to provide horizontal and vertical force resolution components which establish the necessary stresses within the body. For example, with a cylinder diameter of about 130 feet, a cylinder height of about 163 feet and a design pressure of about 60 psi, a helical angle of 55° will require a wall having a thickness of about 4 feet 10 inches. This is the approximate upper practical limit for a structure of this type. On the other hand, when the helix forms an angle of 70° with the horizontal, the necessary wall thickness is about 9 feet 4 inches. This latter thickness is of course undesirable and impractical.

In accordance with the method of the present invention, the erection of a pressure vessel comprises the steps of assembling a plurality of elongated prestressing tendon conduits in an array for receiving a plurality of tendons wherein each of the tendons extends from an anchor location at a first end of the structure successively in a helical path forming an angle of between about 35°–55° with the horizontal to a second end at an upper elevation of the structure. Each of the tendons extends successively along a path defined by an arc in a closure member of the structure and successively in a helical path forming an angle of between about 35° and 55° with the horizontal to said first end of said structure at which location each of the ends of said elongated tendons is anchored and at which location said tendons are stressed. Concrete is placed about the tendon conduits to provide a body having an integrally formed cylindrically-shaped segment which is closed at a second upper end by an integrally formed hemispherical segment. Elongated tendons are passed into each of the conduits, a prestressing force is applied to each of said tendons, and they are anchored at the first end of said structure.

In accordance with other features of the method of the present invention the erection of a structure comprises the steps of initially fabricating a plurality of segments or staves of a body which when assemblied has a configuration conforming to the general configuration of the pressure vessel. These staves include a plurality of studs which extend from a surface of the staves. A plurality of segments of elongated tendon conduits are secured to the studs of each of the staves. The staves are then assembled into a body conforming to the shape of the structure. The segments of individual tendons are then intercoupled to provide a plurality of elongate tendon conduits each extending substantially coextensively with a tendon positioned therein.

These and other objects and features of the invention will become apparent with reference to the following specification and to the drawings wherein:

Figures 1, 3, 6:
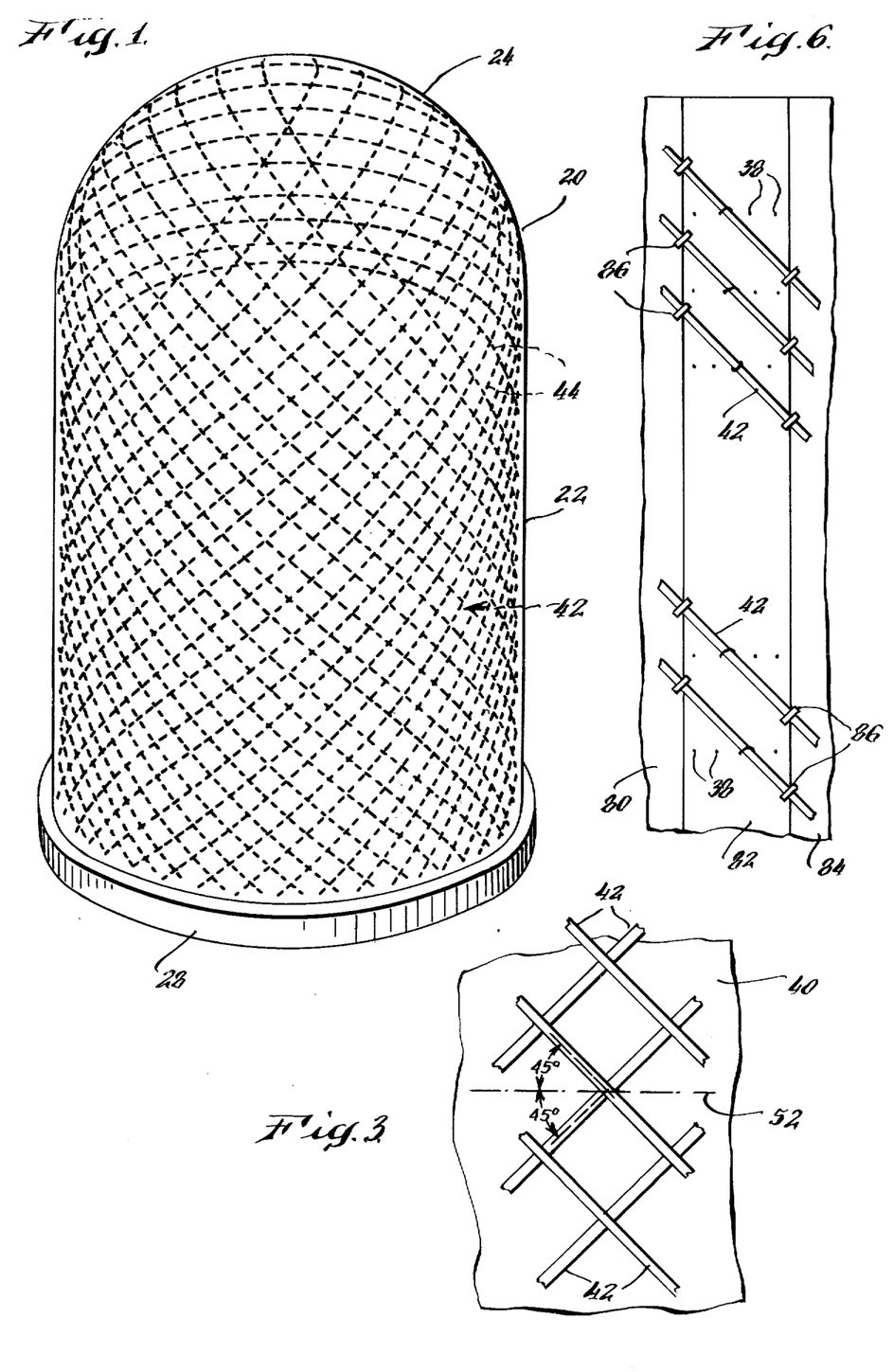
FIG. 1 is a perspective view of a prestressed post-tensioned concrete structure constructed in accordance with features of this invention and wherein a thickness of the wall structure is pictorially removed in order to illustrate a tendon array.
FIG. 3 is a partial enlarged view of one embodiment of the array of tendons of FIG. 1.
FIG. 6 is a partial view of a body conforming to the shape of the structure and illustrating stave members and conduit segments secured thereto.
Figures 4, 5:
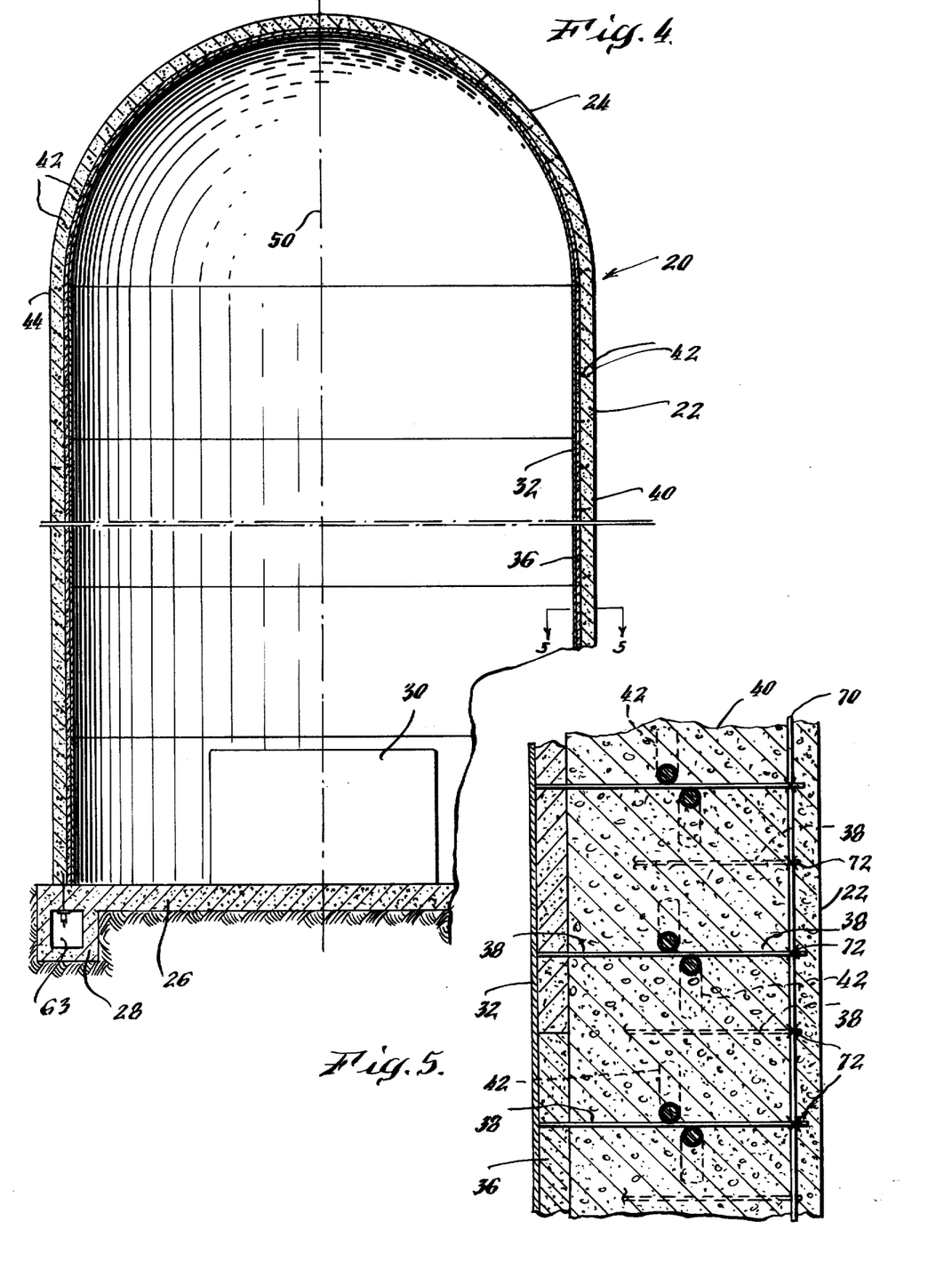
FIG. 4 is a partial sectional view of the structure of FIG. 1 taken along a longitudinal plane through the center of the structure.
FIG. 5 is an enlarged view taken along lines 5—5 of FIG. 4.

Referring now to the drawings and particularly to FIGS. 1 and 4, there is illustrated an upstanding concrete walled body referenced generally as 20 which comprises a hollow cylindrically-shaped segment 22 and a dome-shaped segment 24. The dome-shaped segment 24 which is integrally formed with the cylindrically-shaped segment at a first or upper end thereof and which forms a closure member for the structure is shown to comprise a portion of a hollow sphere and more particular to comprise a hemisphere. The concrete cylindrical segment 22 is cast upon a concrete mat or foundation 26 which is located near a second or lower end of the vertically orientated structure. A concrete gallery or tunnel 28 is integrally formed with the foundation 26 and extends about the foundation at the second or lower end of the structure. A major portion of the wall thickness of the cylindrical segment 22 is positioned on the gallery. As indicated in greater detail hereinafter the gallery provides access to anchoring locations for both post-tensioning and anchoring tendons of the structure.

In order to render the structure substantially impermeable to vapors, gases and liquids which may accidentally emanate from the contained conventional, pressurized water nuclear reactor 30, a steel liner 32 is provided (FIGS 4–6). The liner is formed for example of ¼ steel plate and conforms to the inner surface of the structure. Assembly of the liner is facilitated by forming the cylindrical portion of the liner of staves or vertically extending segments such as the segments 80, 82 and 84 and by forming the dome-shaped portion of spherical segments. Alternatively, the cylindrical portion of the liner can be formed of ring-shaped segments. The segments are then assembled and secured, for example, by welding. Erection of the liner is facilitated by stiffening these liner segments. The liner is stiffened, for example, by forming composite segments of liner material and a layer of concrete. These composite segments have thicknesses ranging on the order of about 6 to 18 inches. The concrete surface 36 which is provided in order to facilitate the erection of the relatively thin walled liner is bonded to the liner segment by a plurality of radially extending reinforcing studs 38. These studs 38 are secured to the plate liner segment by welding or like process and extend outwardly from the plate 32 through the thickness of the outer concrete layer 36 and through the thickness of the concrete wall 40 to a location near the outer surface of this wall.

Figures 2, 7, 8:
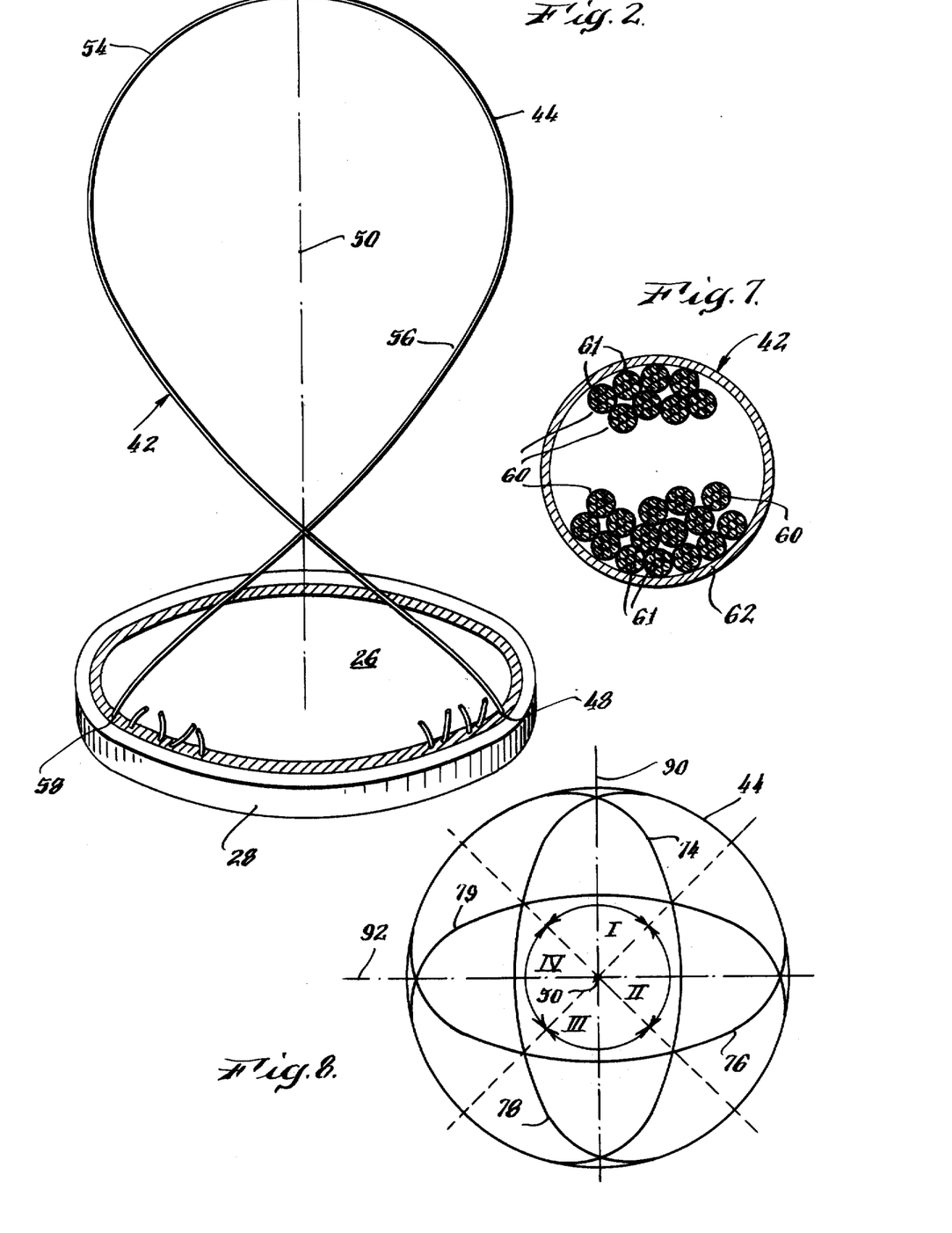
FIG. 2 is a partial view of the structure of FIG. 1 illustrating the locus of one of a plurality of prestressing tendons employed with the structure of FIG. 1.
FIG. 7 is a view in section of a conduit and prestressing tendons comprising a plurality of cable members positioned therein.
FIGS. 8–11 are views of tendon geometries useful in explaining the development of the tendon array of one embodiment of the invention.

A plurality of elongated prestressing post-tensioned tendons 42 extend continuously through the length of the body between anchoring locations which are positioned near the second and lower end of the cylindrical segment 22. Each of the tendons extend in a general helical path between a first anchoring location at the gallery 28 and a ring line 44 of the structure. The ring line comprises a plane extending through the interface between the integrally formed cylindrical segment 22 and the integrally formed dome-shaped segment 24. The elongated tendons extend continuously from a location at the ring 44 in a circular arc about the dome-shaped segment 24 to a second location on the ring line and then extend continuously in a generally helical path to a second anchoring location at the gallery 28. There is illustrated in FIG. 2 an elongated tendon 42 which includes a first segment 46 having an end thereof anchored at a first location 48 at the gallery 28. The segment 46 extends between this location 48 and the ring line 44. The segment 46 extends in a generally helical path about a longitudinal axis 50 of the structure. The tendon 42 (FIG. 2) includes an integral segment 54 which extends through a circular arc between first and second locations at the ring line 44. The tendon 42 further includes an integral segment 56 which extends between the ring line 44 and a second anchoring location 58 at the gallery 28. A plurality of such tendons are provided and are arrayed within the wall thickness of the structure as illustrated in FIG. 1.

The forces exerted on the structure by the elongated tendons comprise radial forces which are directed to the axis 50 and vertically extending forces which operate to resist the tensile forces which can be exerted on the wall of the cylindrically-shaped segment 22 by forces operating on the dome-shaped segment and tending to lift the segment from the cylindrically-shaped structure. These forces are exerted on the cylindrically-shaped body by the helically extending segments 46 and 56 of each of the tendons. In addition, the arc-shaped segment 54 of each of the tendons exerts a radially and a vertical force component on the dome-shaped segment of the structure.

The slope or the angle $\alpha$ which the helical segments form with the horizontal is important since it determines to a large extent the wall thickness and consequently the cost of the structure. In accordance with a feature of this invention, we have found that a slope angle $\alpha$ of about from 35° to 55° and preferably of about from 40° to 50° provides a wall thickness of usable dimensions and yet exhibits the desired mechanical integrity and maintains frictional losses occurring during the tensioning operation to a reasonable level. In a particularly preferred arrangement, the angle formed by the helical path of the segments 46 and 56 with a horizontal plane 52 through the body is 45°. This particular value provides vertical and hoop membrane prestressing forces of substantially equal magnitude.

Each of the tendons which extend through the structure comprises, for example, bundles of steel wires or strands. A tendon arrangement of this type is illustrated in FIG. 7. The cable 60 which comprises bundles or wires or strands 61 is positioned in a semi-rigid metal conduit 62. The conduits extend coextensively with the associated tendons throughout the wall thickness of the structure. During erection of the structure, the plurality of conduits 62 are positioned along loci which are to be occupied by the associated tendons. In the embodiment illustrated in FIG. 5, the conduits are arrayed in two or more radially separated layers extending in a generally vertical direction. As these layers cross the ring line 44, a total of four layers are formed in the dome-shaped segment of the structure. Each of the tendon conduits include segments which are secured to the studs 38 prior to erection of the liner segments. The conduits 42 are secured to the studs 38, for example, by the wire. The conduit segments are arrayed on each of the liner segments for providing that, upon assembly of the liner segments, they define a plurality of elongated tendon conduits occupying predetermined loci about the structure. These segments of an elongated conduit are coupled, subsequent to assembly, by conventional conduit couplers 86 (FIG. 6). Alternatively, the elongated conduits are assembled to the liner subsequent to the erection of the liner body. Each of the conduits extends substantially coextensively with a tendon between a first anchoring location at the gallery 28 and a second anchoring location of this gallery. The gallery 28 provides access to the conduits for passing the tendon cable into the length of the conduit and for subsequently post-tensioning and anchoring the tendons.

In addition to the tendon geometry which provides post-tensioned prestressing of the structure, a concrete reinforcing arrangement is provided near the outer surface of the wall 40. This arrangement comprises a plurality of steel hoops 70 (FIGS. 4 and 5) arrayed in horizontal planes and extending about the structure and positioned within the thickness of the wall 40. In addition, a plurality of vertically extending reinforcing rods 72 are provided and are positioned near the reinforcing hoops 70. These rods are secured and positioned prior to the pouring of the concrete wall 40 by means such as tie wires or the like which secure these vertical rods to the radially extending studs 38. The studs 38 thereby provide a multiplicity of functions including the anchoring of the liner of the concrete wall 40, reinforcing the concrete layer 36, reinforcing the wall 40, supporting the tendon conduits, and providing supporting means for the reinforcing hoops and rods 70 and 72 respectively.

The structure thusfar described is erected by initially integrally casting the concrete foundation 26 and the gallery 28. The plurality of cylindrical steel liner staves or segments are each formed with a layer 36 of concrete (FIG. 5) for stiffening the relatively thin walled liner 32 during erection. The conduit segments are then secured to the studs 38 and the composite staves or segments into a liner body conforming to the shape of the final structure. The cylindrical segments are welded together along their joints. This is accomplished by providing a gap in the concrete layer in order to provide access at the joint for welding equipment. The gaps in the concrete clading which provide access to the assembled liner for welding are, subsequent to welding, filled when the concrete for the wall 40 is subsequently placed. The tendon conduits are positioned in a layer arrangement as illustrated and are arrayed as indicated hereinbefore to provide the desired tendon geometry. These tendons were, as indicated, initially secured in position by means which affix the conduits along their length to studs 38. Subsequent to the assembly of the composite liner segments, the conduit segments are intercoupled and the reinforcing hoops and rods 70 and 72 respectively are assembled in position and are initially secured by means which tie these members to the studs 38. Forms for defining the outer surface of the wall 40 are then positioned in place and the concrete for the wall structure is placed. Various techniques for placing the concrete can be employed. The skeleton tendon and reinforcing arrangement described provides for and facilitates concrete slip forming techniques. The tendons are then introduced into each of the conduits at different locations in the gallery. A first relatively light weight cable or line is passed through the conduits by air pressure. This first cable is secured to and draws a relatively heavier weight cable to the conduit. A tendon is then secured to this cable, and is drawn through the conduit until its length extends coextensively with the conduit. Each of the tendons is then post-tensioned and anchored by the use of hydraulic jacks, for example, to provide the desired stress in the tendon. A grouting composition or a grease or wax is then forced into the conduit and seals the tendon from oxidation and rusting.

While various arrays of tendons may be provided in accordance with this invention, it has been found that the provision of four families of tendons, each family comprising a plurality of tendons which are symmetrical about a given vertical plane establishes a relatively large pressure at the interface between the integrally formed dome-shaped and cylindrically-shaped segments. This relatively large pressure advantageously functions to match the deformation of these segments in the areas of this plane. A plan view of a tendon array of this type is illustrated in FIG. 8. Each of the tendons 74, 76, 78 and 79, for simplicity in illustrating the array, represents a family of tendons. For purposes of explanation, the structure is divided by imaginary vertical planes 90 and 92. The structure is also divided into quadrants I, II, III and IV which are located at 45° angles with respect to these planes. A family of tendons is symmetrical about the vertical planes 90 and 92. The family 74, for example, enters the dome-shaped segment in the area of the spring line 44 in quadrant I and exits from the dome-shaped segment at an opposite point in the quadrant III. Similarly, the family of tendons represented by the tendon 76 enters the dome-shaped segment from the spring line in quadrant II and exits in the oppositely disposed quadrant IV. The tendons 78 and 79 enter the dome-shaped segment from the spring line in quadrants III and IV respectively and exit from the dome-shaped segment at a location on the spring line is oppositely located quadrants I and II respectively. This symmetry results in a bunching or increase in density of the tendons in an outward direction from the axis 50 to the spring line 44.

Various tendon geometries have been considered but have been determined not to be useful or inoperative. For example, if the tendons are arrayed in groups or families which are each arranged concentrically within the wall and are super-imposed in the closure member for example, it will be found after some analysis that the two helical segments of each tendon, i.e., the left-hand and the right-hand segments, will cross at some point in the cylindrical surface. Since the tendons have a finite thickness, this results in an undesirable contact between the tendons or an undesirable weaving of one tendon about the path of the other. When the tendons in each family are arrayed in two concentric surfaces, wherein the right-hand helical segments of the family are positioned in one surface while the left-hand helical segments of the family are positioned in another surface, then the problem of tendon contact and weaving is overcome. However, this array requires two tendon thicknesses for each family within the wall thickness which would occupy on the average of about 48 inches. This dimension in addition to the liner stiffening and outside face reinforcement and concrete cover can result in a wall thickness on the order of about 6½ feet which is wholly uneconomical for this type of structure which requires a typical four hour total wall thickness. In another arrangement, the left-hand helical segments occupy another surface. A plurality of tendon arcs arrayed in four families are arranged on the dome. The tendons however cannot be interconnected without interference since the connection of a number of the arc segments to the associated right and left-hand helical segments in the cylinder cannot be accomplished without weaving. Thus, prior proposals for the arrangement of the plurality of tendons in a structure of reasonable and practical dimensions have been defective in one or more of their aspects.

Accordingly, one of the features of the present invention is the provision of new tendon arrays which avoid the problems encountered with the above-described method of arranging tendons. These inventive tendon arrays generally involve placement of tendons in a plurality of families or groups, such as four or six families. In a preferred tendon arrangement, the plurality of tendons, each of which includes a left and right-hand helical segment are arranged in two pairs of families. The left-hand helical segments of the tendons of a family in a pair is arranged symmetrically about an axis of the structure with respect to the right-hand helical segments of the tendons of the same family of the pair and the two pairs of families are symmetrically arranged about mutually perpendicular axes of the structure. The left-hand helical segments of the tendons are positioned at an inner radial location within the wall of the cylindrical member or at an outer radial location with respect to the right-hand helical segments.

One embodiment of the invention employing four families having their left-hand helical segments positioned in one or two surfaces in the cylindrical body member and the right-hand helical segments positioned in the other of the two surfaces will now be described in detail.

Figures 9, 10:
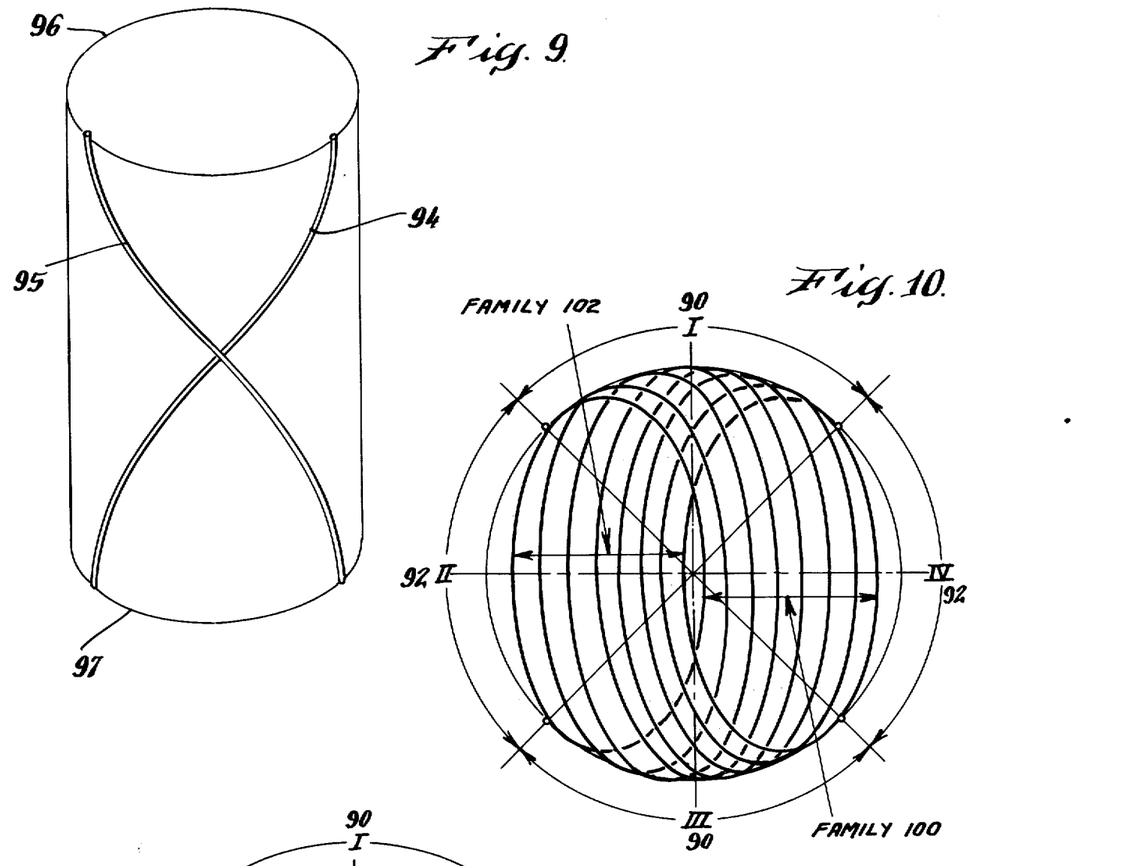

The development of the plurality of families of this embodiment will be explained in greater detail with reference to FIGS. 8 through 11. Each elongated tendon which is positioned in the structure includes a right-hand helical segment 94 (FIG. 9) and a left-hand helical segment 95 extending between the ring line 96 and the gallery 97. The tendons of a family 100 (FIG. 10) in a four family array are generated as indicated in FIG. 10 by connecting each left-hand helix of a tendon extending to the spring line in quadrant I with its symmetrical (i.e., about the plane 92) right-hand tendon helix extending to the spring line in quadrant III. The helixes are connected through a circular arc which lies in a plane that is defined by the tangents to both helixes at the spring line and the theoretical surface of the hemispherical dome. The tendons of the family 102 are similarly generated by connecting each right-hand helix extending to the spring line in quadrant I with its symmetrical (i.e., about the plane 92) left-hand helix extending to the spring line in quadrant III through a circular arc which lies in a plane that is defined by the tangents to both helixes at the spring line and the theoretical surface of the hemispherical dome.

Figure 11:
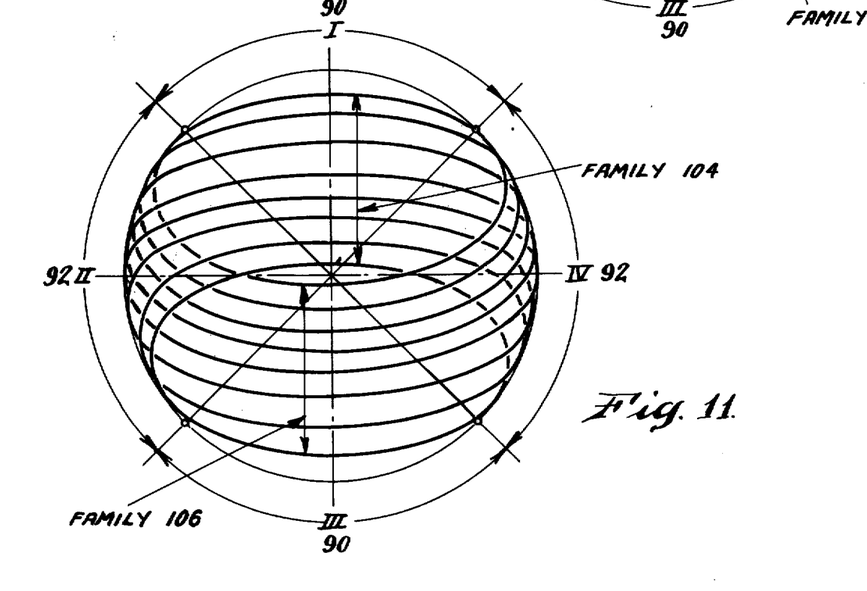
Figures 12, 13, 14, 15:
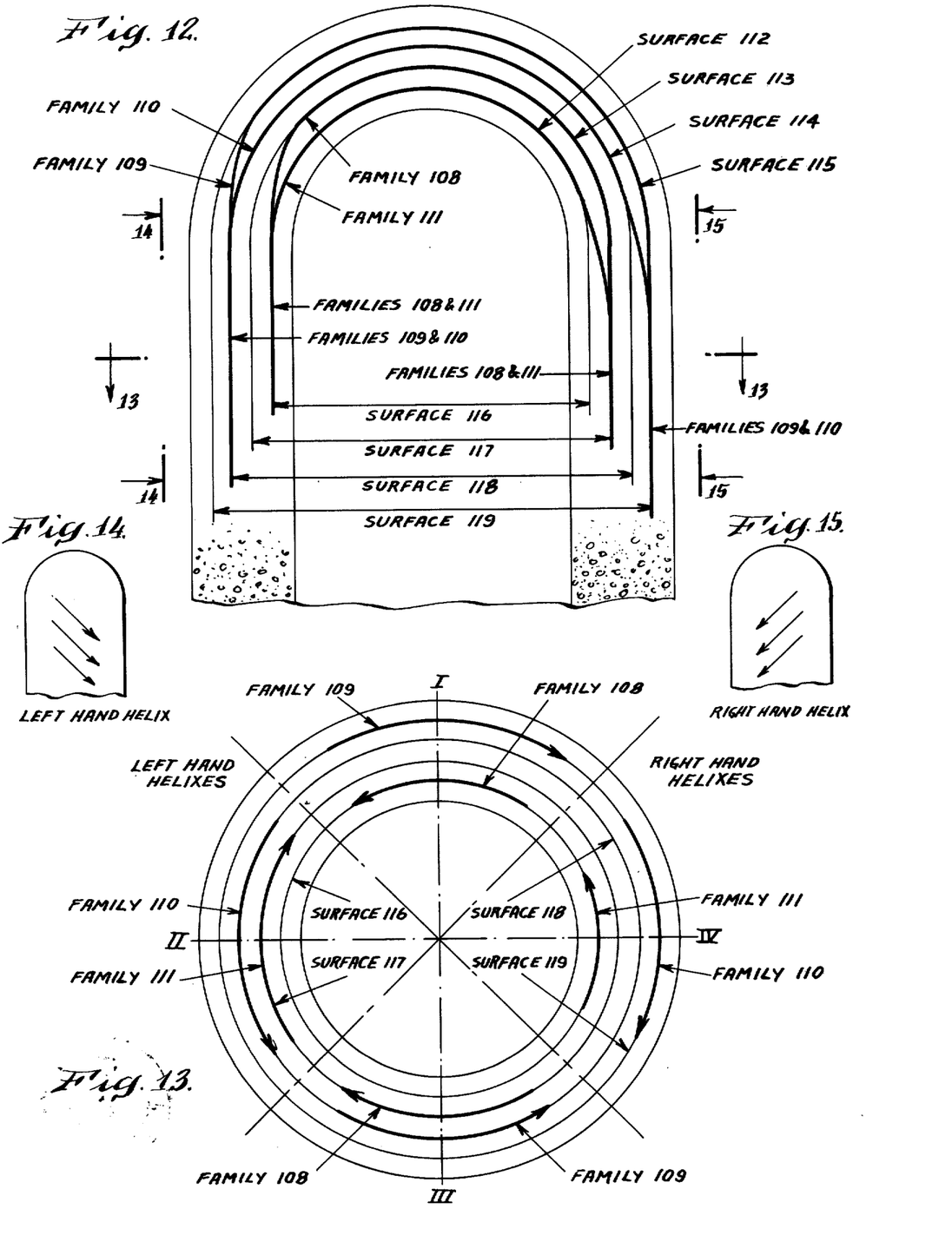
FIGS. 12–15 are views illustrating an alternative tendon array in accordance with the present invention; and, FIGS. 16 and 17 are views illustrating a further alternative tendon array in accordance with the invention.

Tendons 104 of the same four family array are generated as illustrated in FIG. 11 by connecting each left-hand helix extending to the spring line in quadrant II with its symmetrical (i.e., about the quadrant plane 90) right-hand helix extending to the spring line in quadrant IV through a circular arc which lies in a plane that is defined by the tangents to both helixes at the spring line and the theoretical surface of the hemispherical dome. Similarly, tendons 106 are generated by connecting each right-hand helix extending to the spring line in quadrant II with its symmetrical (i.e., about the plane 90) left-hand helix reaching the spring line in quadrant IV through a circular arc which lies in the plane defined by the tangents to both helixes at the spring line and the theoretical surface of the hemispherical dome.

This tendon geometry is advantageous in that it provides a two-way system for post-tensioning tendons over substantially the entire hemispherical dome and it provides for by-passing of the tendons about the apex of the dome by a one-half tendon spacing thus avoiding overlapping at the apex of all four families or leaving a spacing at the apex through which no tendon extends. It results in significantly uniform dome prestresses and at the same time minimizes frictional losses by having a common tangent (i.e., no angular change) with the helixes at the spring line.

Tendons exhibit a finite cross-sectional dimension and for this reason an array which provides for stacking the tendons within the thickness of the cylindrical segment and which avoids interferences, tendon weaving and excessive wall thickness is provided. In one arrangement, the helixes are arranged in only two surfaces. This is accomplished by separately interlocking in the dome each pair of symmetrical tendon families, i.e., families 100 and 102 and families 104 and 106. The interlocking is accomplished in a manner for providing that the tendon family 100 is external, i.e., in an outer portion of the dome thickness with respect to the tendon family 102 in quadrant I but is internal, i.e., in an inner portion of the dome thickness with respect to tendon family 102, in quadrant III. This arrangement is illustrated in FIG. 10. Similarly, the tendon family 102 is thus internal with respect to the tendon family 100 in quadrant I, but is external with respect to tendon family 100 in quadrant III. As illustrated in FIG. 11, the tendon family 104 is external with respect to tendon family 106 in quadrant II but is internal with respect to the tendon family 106 in quadrant IV. The tendon family 106 is thus internal with respect to the tendon family 104 in quadrant II but is external with respect to tendon family 104. This arrangement provides for the placing within the dome of the combination of the two interlocked families 100 and 102 internally with respect to the two interlocked families 104 and 106. As a result of this arrangement, all left-hand helical tendon legs (i.e., family 100 in quadrant I, family 104 in quadrant II, family 102 in quadrant III, and family 106 in quadrant IV) are external with respect to right-hand helical tendon legs (i.e., family 102 in quadrant I, family 106 in quadrant II, family 100 in quadrant III, and family 104 in quadrant IV). This permits the helixes to be arranged in only two surfaces in the cylindrical segment of the structure and thus avoids the problems of weaving and excessive wall thickness associated with tendon arrays heretofore described.

An alternative four family arrangement which avoids tendon weaving and excessive wall thickness, and which constitutes another feature of this invention is illustrated in FIGS. 12–15.

The tendons are arranged into a plurality of pairs of families wherein each of the families extends through the closure member at a differing radial location. The pairs of families are formed by families occupying adjacent radial locations. Left-hand helical extending tendon segments of each pair extend into the wall of the cylindrical body member at substantially the same radical location while the right-hand extending helical tendons of each pair extend into the wall of the cylindrical member at a second differing radial location. Through this arrangement, the tendons of four families occupy four radical locations within the wall of the cylinder. This alternative four family arrangement which avoids tendon weaving and excessive wall thickness and which constitutes another feature of the invention is illustrated in FIGS. 12 through 15.

The positioning of the tendons in the dome and the cylindrical segments is this array will now be described in further detail. In the dome, the tendons of families 108, 109, 110 and 111 are arrayed in four concentric surfaces, 112, 113, 114 and 115 in the dome. Surface 112 is the innermost surface and surface 115 is the outermost surface for tendon location. The tendons are then positioned for providing that surface 112 contains all tendons in family 111, surface 113 contains all tendons in family 108, surface 114 contains all tendons in family 110, and surface 115 contains all tendons in family 109.

In the cylindrical segment, the tendon helical segments are also arranged in four concentric surfaces. These concentric surfaces are designated 116, 117, 118 and 119 with surface 116 representing the innermost surface and 119 representing the outermost surface. As viewed in FIG. 13, a tendon or family of tendons referenced by an arrow extending in a clockwise direction refers to a right-hand helix, i.e., the elevation of the tendon along the cylinder decreases in a clockwise direction. Similarly, tendons referenced by the counterclockwise arrow of FIG. 13 refer to a left-hand helix, i.e., the elevation of the tendon along the cylinder decreases in a counterclockwise direction. The helix locations then appear as follows: the surface 116 contains all left-hand helical legs of tendons in families 108 and 111; the surface 117 contains all the right-hand helical legs of tendons in families 108 and 111; the surface 118 contains all the left-hand helical legs of tendons in families 109 and 110; and, the surface 119 contains all the right-hand helical legs of tendons in families 109 and 110. A smooth transition of tendons from the cylindrical segment to the dome segment is achieved by providing cylindrical concentric surfaces with a radius equal to the radius of the corresponding concentric hemispherical surface. Thus, the radius of 116 will be equal to the radius of 112, the radius of 117 will be equal to the radius of 113, etc. This arrangement of radii will place on common surfaces at the spring line the dome portions of tendons with the following family relationships: family 108 with its right-hand helical legs in quadrant III (surface 117); family 109 with its right-hand helical legs in quadrant I (surface 119); family 110 with its left-hand helical legs in quadrant II (surface 118); and, family 111 with its left-hand helical legs in quadrant IV (surface 116). A smooth transition surface with no outward radial curvature is provided to permit the left-hand helical legs of family 108 in quadrant I to extend from surface 116 to surface 113; the right-hand helical legs of family 111 in quadrant II to extend from surface 117 to surface 112; the left-hand helical legs of family 109 in quadrant III to move from surface 118 to surface 115; and, the right-hand helical legs of family 110 in quadrant IV to move from surface 119 to surface 114. Thus, a plurality of tendons is provided having left and right-hand helical segments which avoids tendon weaving and excessive wall thickness.

Figure 16:
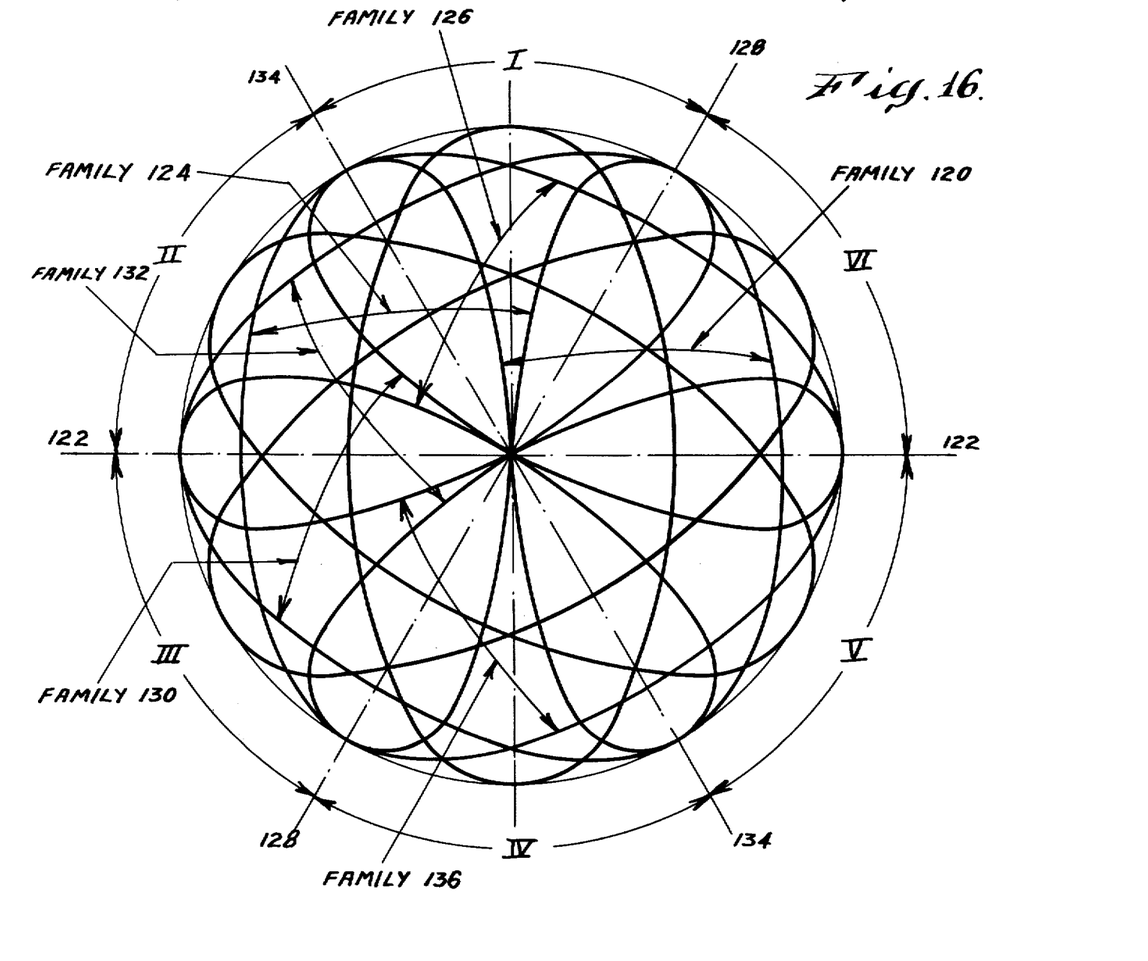
Figure 17:
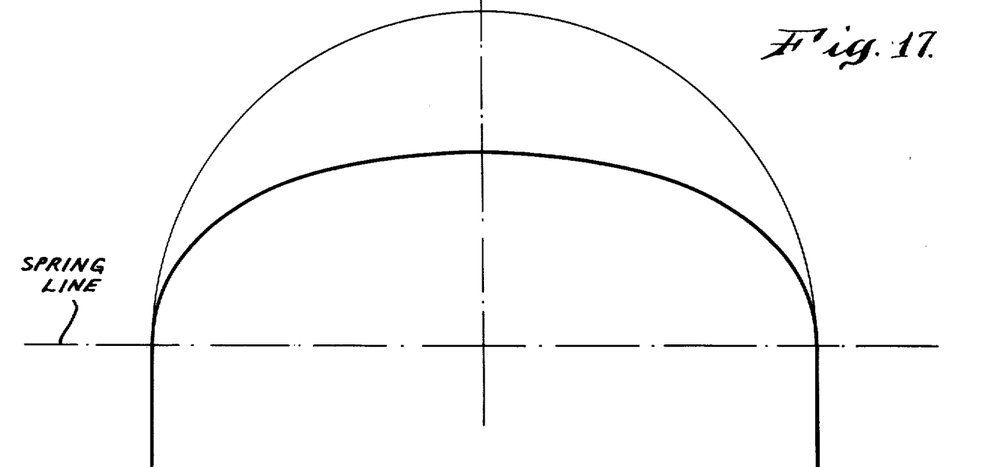

In a further alternative arrangement according to the invention, a six tendon family is provided and is developed as is illustrated in FIGS. 16 and 17. In FIG. 16, the dome is divided into six equal hexads. A family 120 of tendons is generated by connecting each left-hand helix reaching the spring line in section I with its symmetrical (about vertical plane 122) right-hand helix reaching the spring line in section IV, through a curve that results from the intersection of the plane defined by the tangents to both helixes at the spring line and the theoretical surface of the dome. The theoretical surface of the dome is that of a flat dome with a rise of about 60% of the radius of the cylinder. A family 124 of tendons is generated by connecting each right-hand helix reaching the spring line in section I with its symmetrical (i.e., about plane 122) left-hand helix reaching the spring line in section IV through a curve that results from the intersection of the plane defined by the tangents to both helixes at the spring line and the theoretical surface of the dome. A family 126 of tendons is generated by connecting each left-hand helix reaching the spring line in section II with its symmetrical (i.e., about the vertical plane 128) right-hand helix reaching the spring line in section V through a curve that results from the intersection of the plane defined by the tangents to both helixes at the spring line and the theoretical surface of the dome. A family 130 of tendons is generated by connecting each right-hand helix reaching the spring line in section II with its symmetrical (i.e., about plane 128) left-hand helix reaching the spring line in section V through a curve that results from the intersection of the plane defined by the tangents to both helixes at the spring line and the theoretical surface of the dome. A family 132 of tendons is generated by connecting each left-hand helix reaching the spring line in section III with its symmetrical (i.e., about the vertical plane 134) right-hand helix reaching the spring line in section VI through a curve that results from the intersection of the plane defined by the tangents to both helixes at the spring line and the theoretical surface of the dome. A family 136 of tendons is generated by connecting each right-hand helix reaching the spring line in section III with its symmetrical (i.e., about the plane 134) left-hand helix reaching the spring line in section VI through a curve that results from the intersection of the plane defined by the tangents to both helixes at the spring line and the theoretical surface of the dome. Weaving is avoided in a manner similar to that described with respect to the four family arrangement and can be accomplished with helixes located in two surfaces or helixes located in six surfaces.

The containment structure described herein preferably includes an integral hemispherically-shaped closure member. However, the particular shape of the closure member may depart from a strict geometrical hemisphere. It is necessary, however, that the tendon extending through the closure member extend over a continuous curved path. The geometrical shape of the closure member will then vary, for example, from an elipsoid when the angle which the path of the helical tendons forms with the horizontal exceeds 45° to, for example, a parabolic segment or spherical segment when this angle is less than 45°. In addition, and as was illustrated with respect to FIG. 17, as the number of families of tendons increases, the shape of the closure member departs from that of a hemisphere in order that the tendons may extend toward the vicinity of the apex of the member. Thus, for the purpose of the specification and the accompanying claims, the term generally hemispherically shaped will be understood to include a strict geometrical hemisphere as well as encompass these curved geometrical configurations which depart from a hemisphere.

The structure described herein exhibits several advantages over prior art arrangements. The described assembly of tendons reduces both the number of individual tendons required in the structure and accordingly reduces the number of accompanying anchorages required. This represents an enhanced cost factor both from a hardware viewpoint and from a labor viewpoint. The structure thusfar described further eliminates the need for dome rings and buttresses and reduces the labor required during placing of the concrete and stressing of the tendons. The erection of the structure is therefore accomplished in a relatively shorter interval of time. Additionally, the labor costs are reduced since the work need not be done on exposed surfaces of the containment structure for installing and prestressing the tendons. This, therefore, eliminates the need for any concern with inclement weather, the erection of staging or scaffolds, and interference at the interface with adjoining structures. The structure thus erected has a greater ultimate strength. Further, the array provides for a simpler tendon and reinforcement layout and reduces congestion of the skeleton form for concreting. The additional cost encountered as a result of delays in the construction of interfacing buildings and the like is reduced since tendon placement prestressing and anchoring can be accomplished from the gallery.

While particular embodiments of the method and apparatus of this invention have been described herein, it will be appreciated by those skilled in the art that variations may be made thereto without departing from the spirit of the invention and the scope of the appended claims.

What is claimed is:

1. A containment structure comprising:
    an upstanding walled body formed of concrete and having a longitudinal axis thereof;
    said body including an integrally formed generally cylindrical-shaped member and an integrally formed generally hemispherically-shaped closure member;
    a plurality of elongated prestressing tendons extending through the length of the body within the wall of the body between first and second anchor location which are positioned at a same general longitudinal location along the cylindrical member of said structure;
    each of said tendons including a first integral segment which extends along a left-hand helical path through said cylindrical body member, a second integral segment which extends along a right-hand helical path through said cylindrical body member, and an arcuate integral segment extending between said first and second members, said tendon segments extending in helical paths which form an angle with the horizontal of between 35° and 55°.

2. The containment structure of claim 1 wherein the paths of the left and right-hand helical segments cross at a same azimuthal location within the cylinder wall and are spaced apart along a radius of the cylindrical member.

3. The containment structure of claim 2 wherein all of said left-hand helical segments are positioned at an inner radial location or at an outer radial location with respect to all of said right-hand helical segments.

4. The containment structure of claim 2 wherein said tendons are arranged into a plurality of groups, each of said groups includes a plurality of tendons having left and right-hand helical segments wherein the left-hand helical segments are symmetrically arranged about an axis of the structure with respect to said right-hand helical segments of the same tendons and said symmetrically arranged left and right-hand helical segments are interconnected by corresponding arcuate segments extending through the closure member.

5. The containment structure of claim 4 wherein said plurality of tendons are arranged in two pairs of families, and wherein each of the left-hand helical segments of the tendons of a family in a pair is arranged symmetrically about an axis of the structure with respect to the right-hand helical segment of the tendons of the same family of the pair, and pairs of said families are symmetrically arranged about mutually perpendicular axes of the structure.

6. The containment structure of claim 5 wherein all of said left-hand helical segments are positioned at an inner radial location or at an outer radial location with respect to all of said right-hand helical segments.

7. The containment structure of claim 2 wherein six families of tendons are provided.

8. The containment structure of claim 5 wherein the path of each family or tendons in a pair overlaps the path of another family in the same pair for at least a portion of the extension of the paths in the closure member.

9. The containment structure of claim 8 wherein the tendons in a family of a second pair overlap the tendons of another family in the same pair for at least a portion of the extension of the tendons through the closure member, and said pairs are arranged about mutually perpendicular axis.

10. The containment structure of claim 9 wherein substantially all of said left-hand helical extending tendons are located at a substantially same radial location and all of said right-hand helical extending tendons are located at substantially a same radial location which differs from the radial location of said left-hand tendons.

11. The containment structure of claim 3 wherein said tendons are arranged into a plurality of families, each of said families includes a plurality of tendons having left and right-hand helical segments, said families being arranged in pairs, each of said families extending through said closure member at a differing radial location, said pairs of families formed by said families at adjacent radial locations, the left-hand helical extending tendons of each pair extending into the wall of said cylindrical body member at substantially the same radial location and the right-hand extending helical tendons of each pair extending into the wall of said cylindrical body member at a second differing radial location.

12. The nuclear containment structure of claim 11 including a gas or liquid impermeable liner body positioned within said structure and wherein said liner conforms to the inner surface of said structure and includes a plurality of studs which are anchored to said liner and which extend in a direction generally perpendicular to the surface of the liner, and means are provided for securing said tendon conduits to said studs.

13. The nuclear containment structure of claim 12 wherein a first, relatively thin, wall stiffening layer of concrete is formed along a surface of said liner and is secured to said liner by said studs.

14. The nuclear containment structure of claim 13 including a plurality of vertically extending concrete reinforcing rods positioned within said wall near an outer surface thereof, said rods being secured in position prior to placing of concrete for the wall thickness of the structure by means which secure said vertically extending rods to said studs which extend from said liner.

15. The nuclear containment structure of claim 1 wherein said helical tendon segments of said elongated tendons form an angle of about 45° with the horizontal.

16. A method of erecting a pressure vessel comprising the steps of:

assembling a plurality of elongated prestressing tendon conduits in an array wherein each of the tendons in said array extends from an anchor location at a first end of the structure successively in a helical path forming an angle of between about 35°–55° with the horizontal to a second end at an upper elevation of the structure, successively in a path defined by an arc in a closure member of the structure and successively in a helical path forming an angle of between about 35°–55° with the horizontal to said first end of said structure at which location each of the ends of said elongated tendon is anchored and at which end said tendons are stressed;

casting about said tendon array a concrete body having a wall thickness and including a cylindrically shaped member which is closed at said second end by a generally hemispherically shaped member;

passing an elongated tendon into each of said conduits;

anchoring said tendons at said first end of said structure; and, applying to each of said tendons a prestressing force.

* * * * *